United States Patent
Yamabe et al.

(10) Patent No.: US 8,148,993 B2
(45) Date of Patent: Apr. 3, 2012

(54) ABNORMALITY DETECTING DEVICE, ABNORMALITY DETECTING METHOD, AND COMPUTER READABLE MEDIUM STORING AN ABNORMALITY DETECTING PROGRAM

(75) Inventors: Norito Yamabe, Toyohashi (JP); Kouta Togashi, Takatsuki (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 937 days.

(21) Appl. No.: 11/943,547

(22) Filed: Nov. 20, 2007

(65) Prior Publication Data

US 2008/0125932 A1 May 29, 2008

(30) Foreign Application Priority Data

Nov. 29, 2006 (JP) ................................. 2006-321133

(51) Int. Cl.
*G01N 27/416* (2006.01)
(52) U.S. Cl. ...................................................... 324/433
(58) Field of Classification Search .................. 701/29, 701/34; 702/57–59, 60, 63, 64; 324/425, 324/426, 427, 429, 430, 433, 500, 522, 525; 700/292, 293; 340/660–664
See application file for complete search history.

(56) References Cited

U.S. PATENT DOCUMENTS

| | | | | |
|---|---|---|---|---|
| 6,255,826 B1 * | 7/2001 | Ohsawa et al. | ............... | 324/426 |
| 7,459,885 B2 * | 12/2008 | Miyamoto | ..................... | 320/134 |
| 7,466,139 B2 * | 12/2008 | Furukawa | ..................... | 324/511 |
| 7,714,543 B2 * | 5/2010 | Yoshida | ......................... | 320/134 |
| 7,728,598 B2 * | 6/2010 | Murakami et al. | ............ | 324/429 |
| 7,750,640 B2 * | 7/2010 | Yamabe | ......................... | 324/426 |
| 7,821,234 B2 * | 10/2010 | Moriya | ......................... | 320/134 |
| 2009/0099799 A1 * | 4/2009 | Barsoukov et al. | ............. | 702/63 |
| 2010/0136390 A1 * | 6/2010 | Ueda et al. | ...................... | 429/61 |
| 2010/0194398 A1 * | 8/2010 | Kawasumi et al. | ........... | 324/430 |

FOREIGN PATENT DOCUMENTS

JP 2000-206221 A 7/2000
JP 2003-68366 A 3/2003

* cited by examiner

*Primary Examiner* — John Nguyen
*Assistant Examiner* — Michael Whalen
(74) *Attorney, Agent, or Firm* — Christensen O'Connor Johnson Kindness PLLC

(57) ABSTRACT

An abnormality of a current sensor or a voltage sensor is detected. An abnormality detecting section reads out a charging/discharging current I of a secondary battery detected by the current sensor and a battery voltage V of the secondary battery, calculates an estimated battery voltage Vs on the basis of an electromotive force E and an internal resistance r of the secondary battery, and judges the current sensor to be abnormal if the difference between the battery voltage V and the estimated battery voltage Vs is greater than a predetermined threshold and the charging/discharging current I exceeds a predetermined allowable range, and judges the voltage sensor to be abnormal if the difference is greater than the predetermined threshold and the charging/discharging current I is within the predetermined allowable range.

5 Claims, 4 Drawing Sheets

ABNORMALITY DETECTING DEVICE, ABNORMALITY DETECTING METHOD, AND COMPUTER READABLE MEDIUM STORING AN ABNORMALITY DETECTING PROGRAM

PRIORITY INFORMATION

This application claims priority to Japanese Patent Application No. 2006-321133 filed on Nov. 29, 2006, which is incorporated herein by reference in its entirety.

BACKGROUND OF THE INVENTION

1. Field of the Invention

The present invention relates to an abnormality detecting device for detecting an abnormality in a current sensor and a voltage sensor, and more particularly to an abnormality detecting device for a current sensor for detecting current flowing to a secondary battery and for a voltage sensor for detecting battery voltage of the secondary battery.

2. Description of the Related Art

An electric vehicle or a hybrid electric vehicle obtaining vehicular driving force from an electric motor has a secondary battery installed and the electric motor is driven by electric power stored in the secondary battery. Such an electric vehicle is equipped with regenerative braking, namely, a braking function having the electric motor function as a generator during vehicular braking where the kinetic energy of the vehicle is converted into electrical energy. The converted electrical energy is stored into the secondary battery and is reused when performing acceleration.

Since battery performance deteriorates when the secondary battery is over-discharged or over-charged, it is necessary to adjust the charging and discharging operations by recognizing the state of charge (SOC) of the secondary battery. For devices for calculating the SOC of the secondary battery, a method is known for calculating the SOC on the basis of the terminal voltage of the secondary battery. However, since the terminal voltage varies according to current, devices equipped with a voltage sensor and a current sensor for calculating the SOC from both the terminal voltage and the current have been developed in recent years.

When an abnormality is generated at the current sensor in such a device mentioned hereinabove, the SOC of the secondary battery cannot be calculated. As a result, the discharging and the charging of the secondary battery cannot be appropriately controlled. Thus, a device for calculating the SOC having a current sensor is equipped with a device for detecting an abnormality of the current sensor.

Japanese Patent Laid-Open Publication No. 2000-206221 discloses a detecting device for judging a current sensor is abnormal when a voltage detected by a voltage sensor rises and falls at a predetermined frequency or more at a predetermined coefficient of fluctuation or more within a predetermined time while a current value detected by a current sensor continues to indicate approximately zero.

Furthermore, Japanese Patent Laid-Open Publication No. 2003-68366 discloses a detecting device for acquiring an estimated voltage change by multiplying a coefficient k, which is determined on the basis of SOC of a secondary battery, with a charging/discharging current detected by a current sensor, comparing the estimated voltage change with the change in terminal voltage obtained from an actual detected result of a voltage sensor, and issuing a report that there is a sensor abnormality when the difference exceeds a predetermined range.

SUMMARY OF THE INVENTION

One cause of an abnormality of the current sensor is there may be a problem in the supply line or signal line provided by the current sensor.

For example, if these lines are completely disconnected, the current value detected by the current sensor continuously indicates a current value greater than or equal to a threshold. Thus, when there is an abnormality due to a line disconnection and if the current value detected by the current sensor is continuously greater than or equal to a threshold over a period exceeding a predetermined duration, the abnormality can be detected.

On the other hand, one cause of an abnormality of the current sensor is there may be a momentary disconnection (loose connection) in the lines of the current sensor. In this case, the current value detected by the current sensor is unstable so that even if a current value is detected during a predetermine duration, the current value may or may not exceed the threshold. Thus, the abnormality of a momentary disconnection cannot be determined simply because the current value continuously is greater than or equal to the threshold during a period exceeding the predetermine duration.

Additionally, when a secondary battery is installed in a hybrid electric vehicle or the like, there are instances where the current value detected by the current sensor exceeds the threshold for short periods of time even when there is no abnormality at the current sensor. Thus, the current value exceeding the predetermined threshold for short periods does not necessarily indicate an abnormality of the current sensor.

In the abnormality detecting devices also shown in the above-mentioned patent documents, when a current sensor detects a current value momentarily exceeding a predetermined threshold, there is no consideration given as to whether or not the current value is detected by a normal current sensor or erroneously detected by a current sensor that is momentarily disconnected.

It is therefore an object of the present invention to provide an abnormality detecting device capable of detecting an abnormality of the current sensor due to a momentary disconnection.

An abnormality detecting device relating to the present invention, wherein the abnormality detecting device detects an abnormality in at least either a current sensor for detecting a charging/discharging current flowing to a secondary battery or a voltage sensor for detecting a battery voltage of the secondary battery, includes an electromotive force calculating section for calculating an electromotive force E of the secondary battery with at least a charging/discharging current I of the secondary battery detected by the current sensor as a parameter, an estimated voltage calculating section for calculating an estimated battery voltage Vs on the basis of the electromotive force and an internal resistance r of the secondary battery, and an abnormality judgment section for comparing the battery voltage V of the secondary battery detected by the voltage sensor and the estimated battery voltage Vs, and if a difference thereof is greater than a predetermined threshold, judging that at least either the current sensor or the voltage sensor is abnormal.

According to one aspect of an abnormality detecting device relating to the present invention, the abnormality judgment section, if the difference is greater than the predetermined threshold and the charging/discharging current I of the secondary battery detected by the current sensor exceeds a predetermined allowable range, judges that the current sensor is abnormal.

According to one aspect of an abnormality detecting device relating to the present invention, the abnormality judgment section, if the difference is greater than the predetermined threshold and the charging/discharging current I of the secondary battery detected by the current sensor is within the predetermined allowable range, judges that the voltage sensor is abnormal.

According to the present invention, an abnormality of the current sensor for detecting current of the secondary battery and of the voltage sensor for detecting battery voltage of the secondary battery can be detected.

Furthermore, according to one aspect of the present invention, for example, when the current sensor detects a current value momentarily exceeding the predetermined threshold, a distinction is made between whether the current value is detected by a normal current sensor or erroneously detected by a momentarily disconnected current sensor so that the current sensor can be detected as abnormal if momentarily disconnected.

DETAILED DESCRIPTION OF THE PREFERRED EMBODIMENTS

A best mode (referred to hereinafter as embodiment 1) for embodying the present invention illustrates a hybrid electric vehicle and will be described hereinafter with reference to the attached drawings. It should be noted the abnormality detecting section described in embodiment 1 can be mounted in electric vehicles other than hybrid electric vehicles and in various types of devices in which is installed a current sensor.

Figure 1:
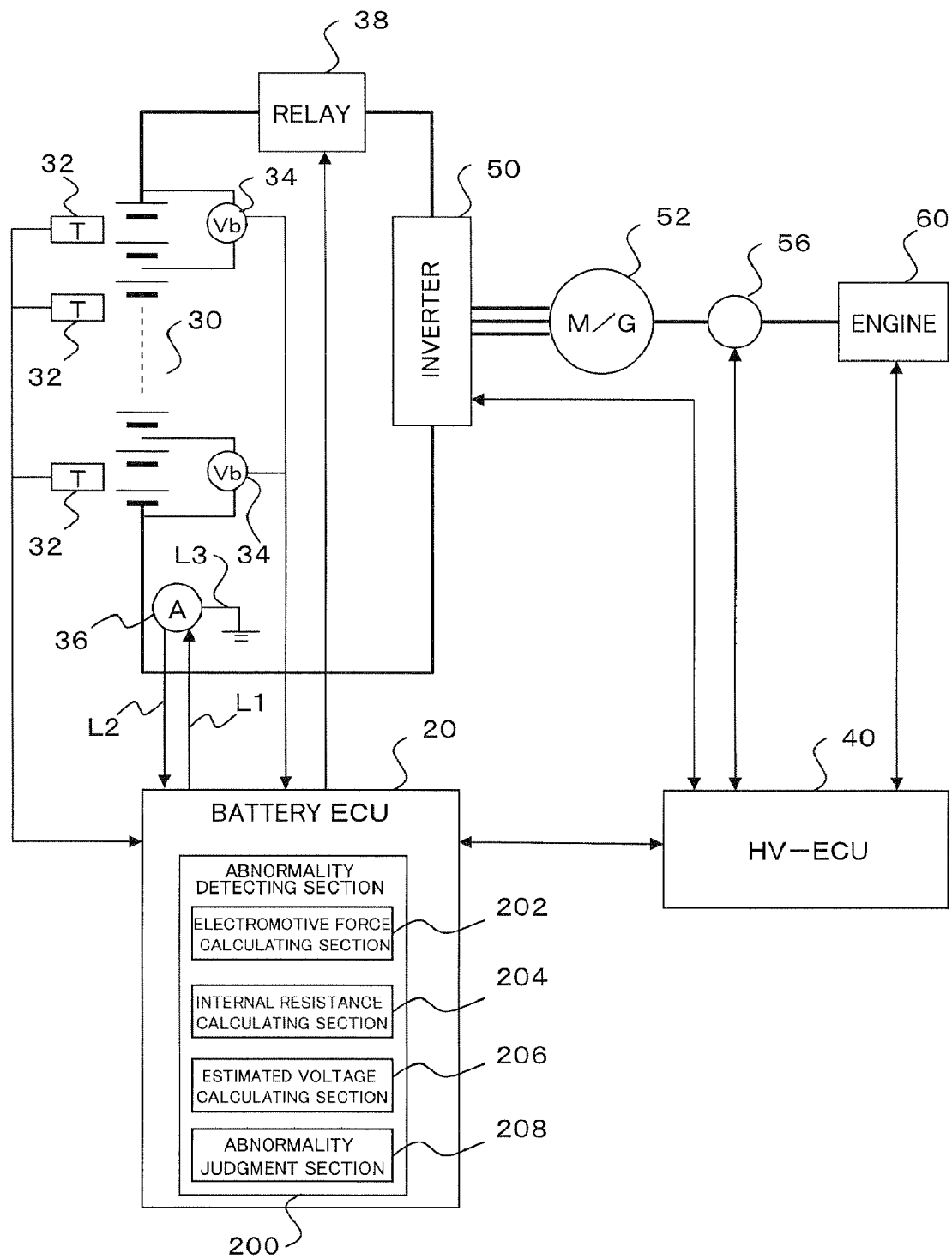
FIG. 1 shows a block diagram of a hybrid electric vehicle relating to embodiment 1.

FIG. 1 shows a block diagram of a hybrid electric vehicle relating to embodiment 1.

In FIG. 1, a battery electronic control unit (referred to hereinafter as battery ECU) 20 receives information on battery voltage, charging/discharging current, battery temperature, and so forth, from a secondary battery 30, calculates SOC of the secondary battery 30, and transmits information on the calculated SOC, battery voltage, battery temperature, and so forth, to a hybrid electronic control unit (referred to hereinafter as HV-ECU) 40. Furthermore, the battery ECU 20 internally includes an abnormality detecting section 200 for detecting an abnormality in a current sensor 36. The abnormality detecting section 200 will be detailed hereinafter. The HV-ECU 40 controls an inverter 50, a driving force distribution mechanism 56, and an engine 60.

The secondary battery 30 is configured by connecting battery blocks in series. Each battery block is configured by serially connecting two battery modules, and furthermore, each battery module is configured by electrically connecting six cells in series. A nickel-metal hydride battery, lithium ion battery, or the like, may be employed for each cell. The numbers of battery blocks, battery modules, and cells are not particularly limited to any quantity. The configuration of the secondary battery is also not limited to the above-mentioned example.

The secondary battery 30 is connected to a motor/generator (M/G) 52 via a relay 38 and the inverter 50. The motor/generator 52 is connected to an engine (internal combustion) 60 via the driving force distribution mechanism 56 that includes a planetary gear mechanism.

Furthermore, a temperature sensor 32 is provided at least at one location on the secondary battery 30 and detects a battery temperature T of the secondary battery 30 at a predetermined period (such as 100 ms). If multiple temperature sensors 32 are provided, one temperature sensor 32, for example, is located at every group where a group has multiple battery blocks with close relative temperatures. Or, one temperature sensor 32 may be located at every battery block having a relative temperature difference. The division into groups or the selection of a battery block to be detected may be performed by measuring the temperature of each battery block, such as from prior experimentation.

Furthermore, a voltage sensor 34 is provided at every battery block and detects a terminal voltage Vb of each battery block at a predetermined period (such 100 ms). The battery ECU 20 sums the terminal voltages Vb of the battery blocks that are output from the voltage sensors 34 to calculate the total battery voltage V of the secondary battery 30.

The current sensor 36 is a non-contact current sensor employing a Hall element. The current sensor 36 has a supply line L1 for receiving a power supply from the battery ECU 20, a signal line L2 for outputting a signal to the battery ECU 20, and a ground line L3. When current flows to the secondary battery, the current sensor 36 outputs a Hall voltage corresponding to the magnitude of the current to the battery ECU 20 via the signal line L2. The battery ECU 20 holds a map showing a relationship between the Hall voltage and the charging/discharging current shown in FIG. 2, and by referencing the map identifies a current corresponding to the input Hall voltage to detect the identified current as the charging/discharging current I. The battery ECU 20 detects, for example, the charging/discharging current I as a negative current during charging and as a positive current during discharging.

Temperature information, battery voltage information, and charging/discharging current information, which are output from the temperature sensor 32, the voltage sensor 34, the current sensor 36, respectively, are input by the battery ECU 20. The battery ECU 20 then calculates the SOC of the secondary battery 30 on the basis of the information input from these sensors. Namely, the information output by the sensors is important so that if the sensors fail when the battery ECU 20 calculates the SOC of the secondary battery 30, the battery ECU 20 cannot accurately calculate the SOC of the secondary battery 30. Furthermore, continuing to charge/discharge the secondary battery 30 on the basis of an inaccurate SOC may cause the battery performance of the secondary battery 30 to deteriorate. Thus, it is preferable to detect abnormalities of the sensors early.

In embodiment 1, the battery ECU 20 internally includes the abnormality detecting section 200 for detecting an abnormality of the current sensor 36, which detects the charging/discharging current, an important parameter when calculating the SOC of the secondary battery 30 as described above.

Figure 2:
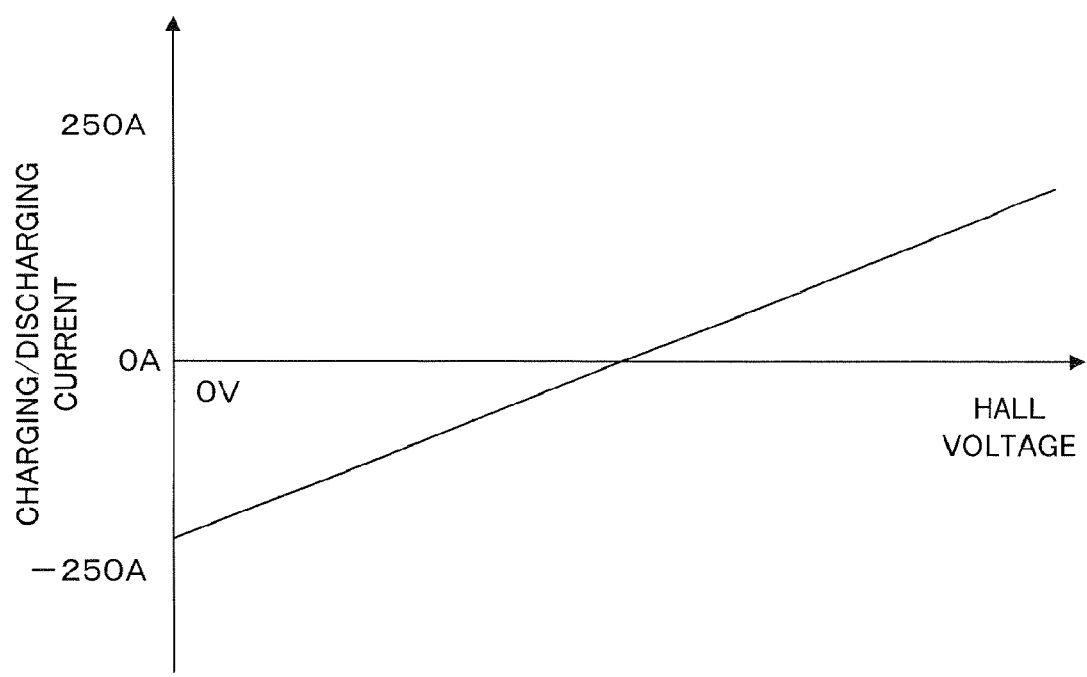
FIG. 2 shows a relationship between a Hall voltage that is output from a current sensor and a current value flowing through an element to be detected.

For example, if the supply line L1 or the signal line L2 provided by the current sensor 36 disconnects, the Hall voltage input by the battery ECU 20 from the signal line L2 indicates zero. If the Hall voltage is zero, the charging/discharging current I detected by the battery ECU 20 as shown in FIG. 2 becomes a large current of −250 A, for example. As described above, the secondary battery 30 is, for example, a nickel-metal hydride secondary battery or a lithium ion secondary battery. Since there is a risk of battery deterioration with ordinary charging/discharging control, control operations are not performed over a long duration where such large currents flow. Heretofore, in the case where a charging/discharge current I exceeding a predetermined allowable range and exceeding a predetermined duration is detected by the current sensor 36 despite the fact that the charging/discharging control for the secondary battery 30 is being performed normally, for example, and the current sensor 36 outputs a signal having a Hall voltage of zero, the battery ECU 20 detected the current sensor 36 as being abnormal.

On the other hand, in the case where the supply line L1 and the signal line L2 are momentarily disconnected, the current sensor 36 momentarily outputs a signal indicating that the Hall voltage is zero but does not continuously output the signal over a predetermined duration. Thus, the abnormality of the momentary disconnection cannot be detected under the condition for conventional abnormality detection. Furthermore, in the case of the secondary battery loaded in a hybrid vehicle or the like, although a large current does not normally flow over a long duration, a large current may flow momentarily. Therefore, even if the current sensor 36 outputs a signal indicating the Hall voltage is zero, an abnormality due to a momentary disconnection cannot always be detected.

In embodiment 1, a procedure hereinafter enables the abnormality detecting section 200 to detect that the current sensor 36 is not accurately detecting a current value due to a momentary disconnection, such as in the supply line, signal line, or ground line.

The abnormality detecting section 200 has an electromotive force computing section 202, an internal resistance computing section 204, an estimated voltage computing section 206, and an abnormality judgment section 208. The electromotive force computing section 202 computes the electromotive force E of the secondary battery 30 on the basis of charging/discharging current I of the secondary battery 30 and so forth. The internal resistance computing section 204 computes the internal resistance r of the secondary battery 30, for example, on the basis of the charging/discharging current I of the secondary battery 30, the battery voltage V of the secondary battery 30, and so forth. Furthermore, the estimated voltage computing section 206 computes the estimated battery voltage Vs of the secondary battery 30 on the basis of the electromotive force E and the internal resistance r. Additionally, the abnormality judgment section 208 compares the estimated battery voltage Vs and the battery voltage V detected by the voltage sensor 34, and judges the abnormality of the current sensor 36 on the basis of the difference thereof. The processing of each section will be detailed hereinafter.

The procedure for the abnormality detecting section 200 to detect an abnormality of the current sensor 36 will be described hereinafter with reference to the flowchart shown in FIG. 3. The abnormality detecting section 200 executes the procedure in the flowchart show in FIG. 3 at, for example, a predetermined period.

First, the abnormality detecting section 200 reads out (S100) the charging/discharging current I that was detected by the current sensor 36, such as from memory provided within the battery ECU 20, and judges (S102) whether or not the charging/discharging current I is within a predetermined allowable range (for example, −250 A<I<250 A). As a result of the judgment, if the predetermined allowable range is not exceeded (judgment result of step S102 is an affirmative "Y"), the abnormality detecting section 200 terminates the process. On the other hand, if the predetermined allowable range is exceeded (judgment result of step S102 is a negative "N"), the abnormality detecting section 200 further reads out (S104) the battery voltage V that was detected by the voltage sensor 34 and computes (S106) the electromotive force E and the internal resistance r of the secondary battery 30.

The electromotive force E and the internal resistance r may be calculated with a known method. For example, the electromotive force E is calculated in the following manner.

Namely, the abnormality detecting section 200 acquires and stores several data pairs of the battery voltage V and the charging/discharging current I during a predetermined duration (for example, 60 seconds), obtains a primary approximation line (voltage V−current I approximation line) through regression analysis of the data pairs, and obtains the V intercept of the V-I approximation line as the battery voltage V0 (no-load voltage). Furthermore, the integrated value ∫I of the charging/discharging current I is computed, the polarized voltage Vp of the battery is obtained from a function of the battery temperature T, battery voltage V0, and current integrated value ∫I, the polarized voltage Vp is subtracted from the battery voltage V0, and the electromotive force E of the battery is obtained.

On the other hand, the internal resistance r, for example, can be calculated by determining the slope of the above-mentioned voltage V versus current I approximation line. Furthermore, since the internal resistance r varies with the battery temperature T, a map showing the relationship between the battery temperature T and the internal resistance r is first created, such as from prior experimentation, and the internal resistance r corresponding to the battery temperature T may be identified and determined by referencing the map.

Furthermore, aside from the charging/discharging current I and the battery voltage V, which are read out at this time in step S102, the internal resistance r may be determined on the basis of the charging/discharging current I' and the battery voltage V', which were previously detected by the respective sensors. More specifically, the charging/discharging currents and the battery voltages are given in the following expressions.

$$V = E - Ir \quad (1)$$

$$V' = E' - I'r' \quad (2)$$

The measurement period of each sensor is short (100 ms, for example) so that the approximations of E=E' and r=r' can be made. Thus, expression (3) can be derived for determining the internal resistance r from expression (1) and expression (2).

$$r = -(V-V')/(I-I') \quad (3)$$

As described above, after the electromotive force E and the internal resistance r of the secondary battery 30 are computed, the abnormality detecting section 200 computes (S108) the estimated battery voltage Vs on the basis of the charging/discharging current I, electromotive force E, and internal resistance r. Namely, Vs=E−Ir is calculated. Next, the abnormality detecting section 200 compares the estimated battery voltage Vs that was computed on the basis of the charging/discharging current I detected by the current sensor 36 and the battery voltage V, which is the actual measured value, and judges the abnormality of the current sensor 36 on the basis of the difference thereof. More specifically, the abnormality detecting section 200 judges (S110) whether or not the difference between the estimated battery voltage Vs and the battery voltage V, which is the actual measured value, exceeds a predetermined abnormality detection threshold k. If the predetermined abnormality detection threshold k is exceeded, an abnormality signal is issued (S112) indicating the current sensor 36 is abnormal.

Since the secondary battery 30 has the internal resistance r as described above, the battery voltage when the charging/discharging current I, which is detected by the current sensor 36, actually flows to the secondary battery 30 and the battery voltage when the charging/discharging current I does not flow to the secondary battery 30 are different. When the charging/discharging current I actually flows to the secondary battery 30, the estimated voltage Vs, which is calculated on the basis of the charging/discharging current I, and the battery voltage V, which is detected by the voltage sensor 34, correspond substantially. On the other hand, when the charging/discharging current I does not actually flow to the secondary battery 30, they do not correspond. Namely, there is a possibility that the charging/discharging current I detected by the current sensor 36 is in error. In embodiment 1, if the charging/discharging current I exceeds the predetermined allowable range and the difference between the estimated battery voltage Vs and the battery voltage V exceeds the predetermined abnormality detection threshold k, the abnormality detecting section 200 judges there is an abnormality of the current sensor 36 by determining the charging/discharging current I detected by the current sensor 36 is not detected as flowing to the secondary battery 30 but detected from a momentary disconnection in a line.

Thus, according to embodiment 1, an abnormality of the current sensor 36 due to a momentary disconnection can be detected.

Next, embodiment 2 will be described. Embodiment 2 differs from the abovementioned embodiment 1 wherein the abnormality detecting section 200 judges there is an abnormality of the voltage sensor 36 if the charging/discharging current I is within the predetermined allowable range and the difference between the estimated battery voltage Vs and the battery voltage V exceeds the predetermined abnormality detection threshold k.

Figure 4:
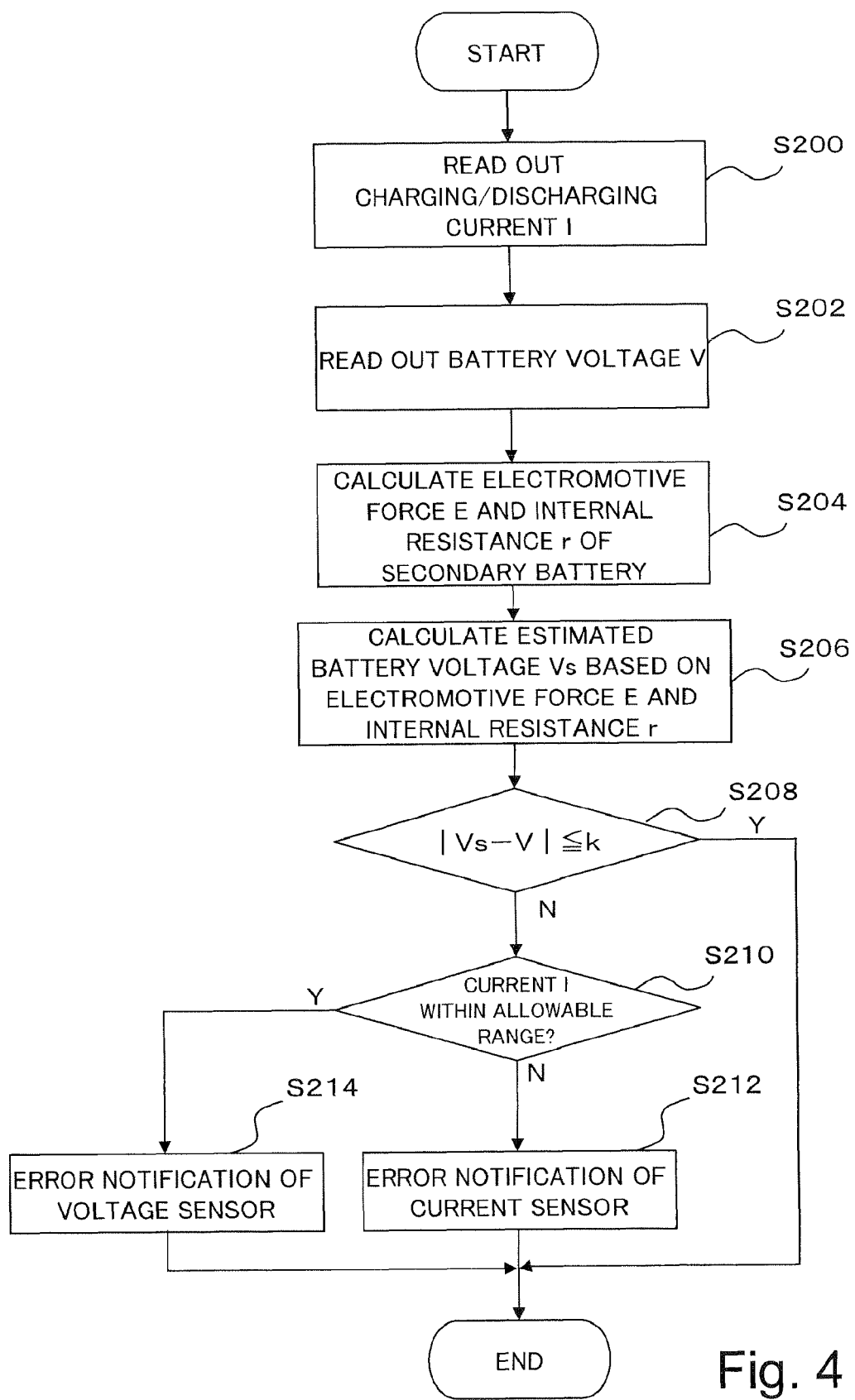
FIG. 4 is a flowchart showing a procedure of abnormality detection executed by the abnormality detecting section relating to embodiment 2.

FIG. 4 is a flowchart showing a procedure in embodiment 2 wherein the abnormality detecting section 200 detects an abnormality of the current sensor 36 or the voltage sensor 34. Hereinafter, the procedure for the abnormality detecting section 200 in embodiment 2 will be described with reference to FIG. 4. As in the abovementioned embodiment 1, the abnormality detecting section 200 executes the processing of the flowchart shown in FIG. 4 at, for example, a predetermined period.

The abnormality detecting section 200 reads out (S200, S202) the charging/discharging current I and the battery voltage V, such as from the respective memory provided within the battery ECU 20. Next, as in embodiment 1, the abnormality detecting section 200 computes (S204) the electromotive force E and internal resistance r of the secondary battery 30, and further computes (S206) the estimated battery voltage Vs of the secondary battery 30 on the basis of the electromotive force E and internal resistance r. Then, the abnormality detecting section 200 judges (S208) whether or not the difference between the estimated battery voltage Vs and the battery voltage V, which is an actual measured value, exceeds the predetermined abnormality detection threshold k. As a result of the judgment, if the predetermined abnormality detection threshold k is exceeded (judgment result of step S208 is a negative "N"), the abnormality detecting section 200 further judges (S210) whether or not the charging/discharging current I is within the predetermined allowable range (for example, −250 A<I<250 A).

As a result of the judgment, if the charging/discharging current I exceeds the predetermined allowable range (judgment result of step S210 is a negative "N"), an abnormality signal is issued (S212) as in the above-mentioned embodiment 1 indicating the current sensor 36 is abnormal.

On the other hand, as a result of the judgment, if the charging/discharging current I is within the predetermined allowable range (judgment result of step S210 is an affirmative "Y"), the battery voltage V, which is the actual measured value, is in error and not the estimated battery voltage Vs. Namely, an abnormality signal for the voltage sensor is issued (S214) indicating the voltage sensor is abnormal.

According to embodiment 2, not only can an abnormality of the current sensor 36 be detected from a momentary disconnection, but an abnormality of the voltage sensor 34 can also be detected.

Figure 3:
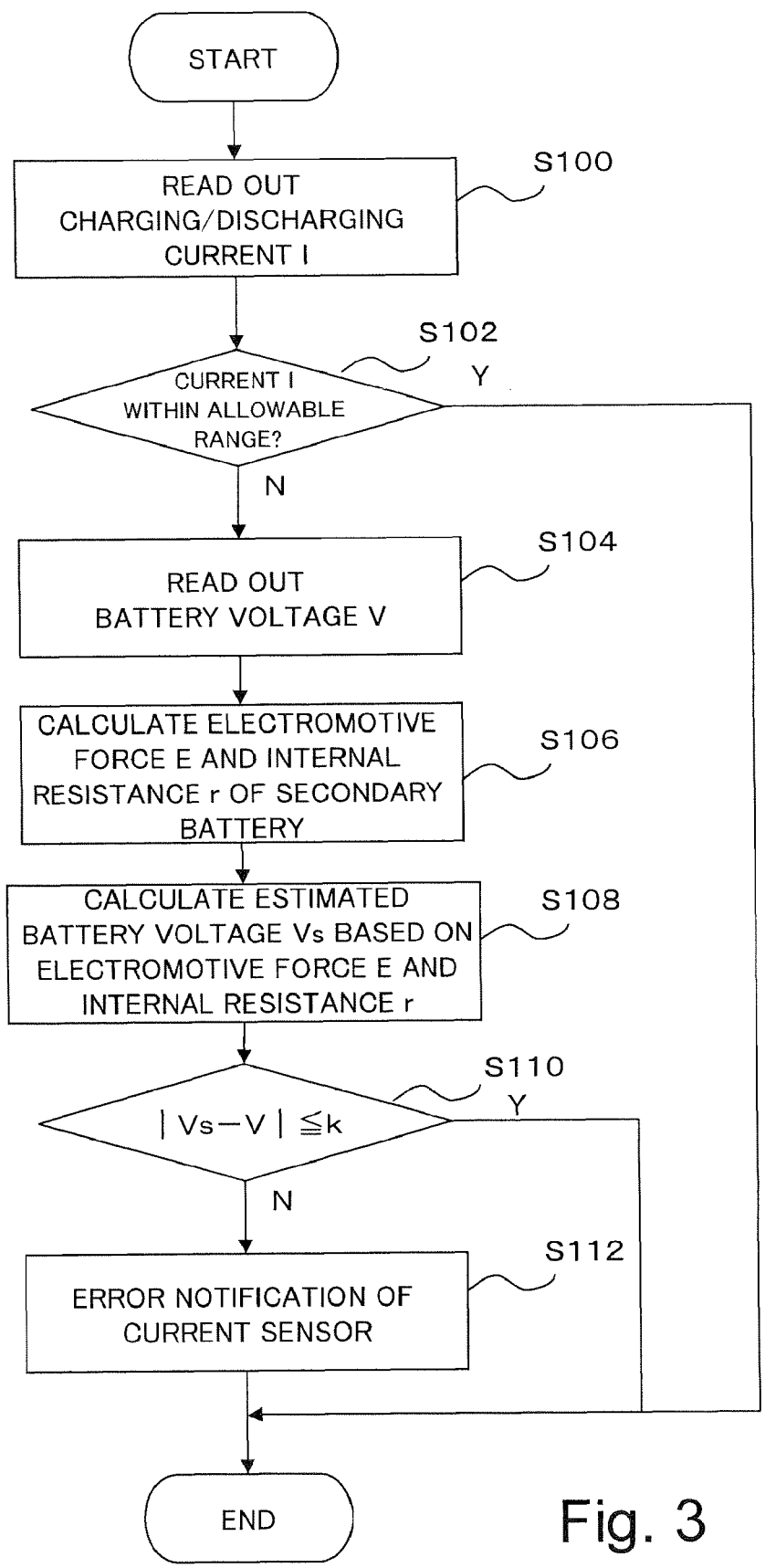
FIG. 3 is a flowchart showing an abnormality detecting procedure executed by an abnormality detecting section relating to embodiment 1.

The abnormality detecting section 200 can be implemented by installing an abnormality detection program that embodies the various processes shown in FIG. 3 and FIG. 4 into a microcomputer and executing the abnormality detection program.

Namely, the microcomputer has various types of memory, such as CPU, ROM, RAM, EEPROM, and so forth, a communication bus, and an interface, and reads the abnormality detection program stored in advance in ROM as firmware, which the CPU sequentially executes. For example, when the abnormality detection program is executed for performing the procedure shown in FIG. 3, the CPU reads out the charging/discharging current I, which is input from the current sensor via the interface and stored into memory, and judges whether or not the charging/discharging current I is within the predetermined allowable range. Furthermore, if the charging/discharging current I exceeds the predetermined allowable range, the CPU reads out the battery voltage V, which is input from the current sensor via the interface and stored into memory, and computes the electromotive force E and internal resistance r of the secondary battery 30. Next, the CPU computes the estimated battery voltage Vs on the basis of the electromotive force E and the internal resistance r. If the difference between the estimated battery voltage Vs and the battery voltage V, which is the actual measured value, exceeds the predetermined abnormality detection threshold k, the current sensor is judged to be abnormal.

Furthermore, when the abnormality detection program for performing the procedure shown in FIG. 4 is executed, the CPU reads out the battery voltage V and the charging/discharging current I, which are input from the voltage sensor and the current sensor via the interface and stored into memory, and computes the electromotive force E and the internal resistance r of the secondary battery 30. Next, the CPU computes the estimated battery voltage Vs on the basis of the electromotive force E and the internal resistance r and judges whether or not the difference between the estimated battery voltage Vs and the battery voltage V, which is the actual measured value, exceeds the predetermined abnormality detection threshold k. Furthermore, if the abnormality detection threshold k is exceeded, the CPU judges whether or not the charging/discharging current I is within the predetermined allowable range. If the charging/discharging current I is within the predetermined allowable range, the voltage sensor is judged to be abnormal. If the charging/discharging current I exceeds the predetermined allowable range, the current sensor is judged to be abnormal.

Furthermore, examples of the above-mentioned embodiment 1 and embodiment 2 were described wherein the battery ECU 20 functions as the abnormality detecting section 200. However, another unit, such as the HV-ECU 40, may be designed to function as the abnormality detecting section 200.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An abnormality detecting device for detecting an abnormality in at least either a current sensor for detecting a charging/discharging current flowing to a secondary battery or a voltage sensor for detecting a battery voltage of said secondary battery, comprising:
    an electromotive force calculating section for calculating an electromotive force E of said secondary battery by subtracting a polarized voltage Vp from a no-load battery voltage V0, wherein said polarized voltage is calculated with at least a charging/discharging current I of said secondary battery detected by said current sensor as a parameter;
    an estimated voltage calculating section for calculating an estimated battery voltage Vs on the basis of said electromotive force, an internal resistance r of said secondary battery, and the charging/discharging current I detected by said current sensor; and
    an abnormality judgment section for comparing the battery voltage V of the secondary battery detected by said voltage sensor and said estimated battery voltage Vs, and if a difference thereof is greater than a predetermined threshold, judging that at least either said current sensor or said voltage sensor is abnormal.

2. An abnormality detecting device according to claim 1, wherein:
    said abnormality judgment section, if said difference is greater than the predetermined threshold and the charging/discharging current I of said secondary battery detected by said current sensor exceeds a predetermined allowable range, judges that said current sensor is abnormal.

3. An abnormality detecting device according to claim 1, wherein:
    said abnormality judgment section, if said difference is greater than the predetermined threshold and the charging/discharging current I of said secondary battery detected by said current sensor is within the predetermined allowable range, judges that said voltage sensor is abnormal.

4. An abnormality detecting method for detecting an abnormality in at least either a current sensor for detecting a charging/discharging current flowing to a secondary battery or a voltage sensor for detecting a battery voltage of said secondary battery, comprising:
    a calculating step for calculating an electromotive force E of said secondary battery by subtracting a polarized voltage Vp from a no-load battery voltage V0, wherein said polarized voltage is calculated with at least a charging/discharging current I of said secondary battery detected by said current sensor as a parameter;
    a calculating step for calculating an estimated battery voltage Vs on the basis of said electromotive force, an internal resistance r of said secondary battery, and the charging/discharging current I detected by said current sensor; and
    a step for comparing the battery voltage V of the secondary battery detected by said voltage sensor and said estimated battery voltage Vs, and if a difference thereof is greater than a predetermined threshold, judging that at least either said current sensor or said voltage sensor is abnormal.

5. A computer readable medium storing a program causing a computer to execute a process for detecting an abnormality of a current sensor for detecting a current flowing to a secondary battery, said process comprising:
    calculating an electromotive force E of said secondary battery by subtracting a polarized voltage Vp from a no-load battery voltage V0, wherein said polarized voltage is calculated with at least a charging/discharging current I of said secondary battery detected by said current sensor as a parameter;
    calculating an estimated battery voltage Vs on the basis of said electromotive force an internal resistance r of said secondary battery, and the charging/discharging current I detected by said current sensor; and
    comparing the battery voltage V of the secondary battery detected by said voltage sensor and said estimated battery voltage Vs, and if a difference thereof is greater than a predetermined threshold, judging that at least either said current sensor or said voltage sensor is abnormal.

* * * * *